US010871209B2

(12) United States Patent
Konno

(10) Patent No.: US 10,871,209 B2
(45) Date of Patent: Dec. 22, 2020

(54) CHAIN AND CHAIN TRANSMISSION DEVICE

(71) Applicant: TSUBAKIMOTO CHAIN CO., Osaka (JP)

(72) Inventor: Masahiko Konno, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 359 days.

(21) Appl. No.: 15/879,811

(22) Filed: Jan. 25, 2018

(65) Prior Publication Data

US 2018/0223969 A1    Aug. 9, 2018

(30) Foreign Application Priority Data

Feb. 6, 2017    (JP) .................................. 2017-019666

(51) Int. Cl.
| | | |
|---|---|---|
| *F16H 7/18* | (2006.01) | |
| *F16H 7/08* | (2006.01) | |
| *F16H 7/02* | (2006.01) | |

(52) U.S. Cl.
CPC ................. *F16H 7/18* (2013.01); *F16H 7/08* (2013.01); *F16H 2007/026* (2013.01); *F16H 2007/0872* (2013.01)

(58) Field of Classification Search
CPC .......... F16G 13/04; F16G 13/06; F16G 13/02; B62M 9/00; F16H 2007/0872
USPC ......................................... 474/206, 212, 226
See application file for complete search history.

(56) References Cited

U.S. PATENT DOCUMENTS

| | | | | |
|---|---|---|---|---|
| 3,359,815 A | * | 12/1967 | Mueller ................ | B21L 15/005 474/231 |
| 3,792,623 A | * | 2/1974 | Kuratomi ................ | F16G 13/06 474/231 |
| 4,741,725 A | * | 5/1988 | Ingold ..................... | F16G 13/06 474/212 |
| 5,203,745 A | * | 4/1993 | Wang ...................... | F16G 13/06 474/206 |
| 5,322,482 A | * | 6/1994 | Wang ...................... | F16G 13/06 474/206 |
| 5,337,886 A | * | 8/1994 | Anderson .............. | B65G 19/20 198/728 |

(Continued)

FOREIGN PATENT DOCUMENTS

| | | |
|---|---|---|
| CN | 101008430 A | 8/2007 |
| CN | 101563552 A | 10/2009 |
| JP | 2006-242357 A | 9/2006 |

*Primary Examiner* — Henry Y Liu
(74) *Attorney, Agent, or Firm* — Westerman, Hattori, Daniels & Adrian, LLP

(57) ABSTRACT

An object of the present invention is to provide a chain and a chain transmission device capable of reducing sliding resistance of the chain to a guide lip portion and stably maintaining an oil film between the guide lip portion and an outer plate. Provided is a chain 20 wherein a plurality of link plates 40 and 60 include outer plates 60, each of the outer plates 60 has a pair of front and rear pin holes 61 into which connecting pins 50 are inserted, a guide-side end surface 62 that faces a traveling guide surface 81*a* side of a chain guide 80, and a contact convex portion 63 that protrudes from an outer surface of the outer plate 60, and the contact convex portion 63 is formed in an area between the pin holes 61 and the guide-side end surface 62 in a plate height direction.

6 Claims, 17 Drawing Sheets

(56) References Cited

U.S. PATENT DOCUMENTS

| | | | | |
|---|---|---|---|---|
| 5,902,203 A * | 5/1999 | Kanehira | ........ | F16G 13/04 |
| | | | | 474/212 |
| 6,406,394 B1 * | 6/2002 | Bubel | ........ | F16G 13/04 |
| | | | | 474/212 |
| 7,543,437 B1 * | 6/2009 | Chin | ........ | F16G 13/06 |
| | | | | 474/218 |
| 7,789,782 B2 * | 9/2010 | Komada | ........ | F16G 13/04 |
| | | | | 474/206 |
| 8,137,226 B2 * | 3/2012 | Yoshida | ........ | F16G 13/04 |
| | | | | 474/213 |
| 8,920,272 B2 * | 12/2014 | Tokita | ........ | F16G 13/04 |
| | | | | 474/212 |
| 2002/0123402 A1 * | 9/2002 | Mott | ........ | F16G 1/28 |
| | | | | 474/148 |
| 2003/0233821 A1 * | 12/2003 | Matsuda | ........ | F16G 13/04 |
| | | | | 59/5 |
| 2003/0236145 A1 * | 12/2003 | Ledvina | ........ | F16G 5/18 |
| | | | | 474/215 |
| 2005/0187055 A1 * | 8/2005 | Morishige | ........ | F16G 13/04 |
| | | | | 474/206 |
| 2005/0202914 A1 * | 9/2005 | Reiter | ........ | F16G 13/06 |
| | | | | 474/206 |
| 2006/0199689 A1 * | 9/2006 | Yoshimoto | ........ | F16H 7/18 |
| | | | | 474/111 |
| 2007/0072718 A1 * | 3/2007 | Kotani | ........ | F16G 13/04 |
| | | | | 474/212 |
| 2008/0015071 A1 * | 1/2008 | Fujiwara | ........ | F16G 13/06 |
| | | | | 474/206 |
| 2008/0273827 A1 * | 11/2008 | Fujiwara | ........ | C23C 8/72 |
| | | | | 384/625 |
| 2009/0149288 A1 * | 6/2009 | Sonoda | ........ | F16G 13/04 |
| | | | | 474/212 |
| 2010/0016110 A1 * | 1/2010 | Yoshida | ........ | F16G 13/04 |
| | | | | 474/213 |
| 2011/0028256 A1 * | 2/2011 | Godfrey | ........ | F16G 13/06 |
| | | | | 474/228 |
| 2011/0183800 A1 * | 7/2011 | Tohara | ........ | F16G 13/18 |
| | | | | 474/206 |
| 2017/0067536 A1 * | 3/2017 | Dos Santos | ........ | F16G 13/06 |
| 2019/0048973 A1 * | 2/2019 | Fukumori | ........ | F16H 55/30 |

\* cited by examiner

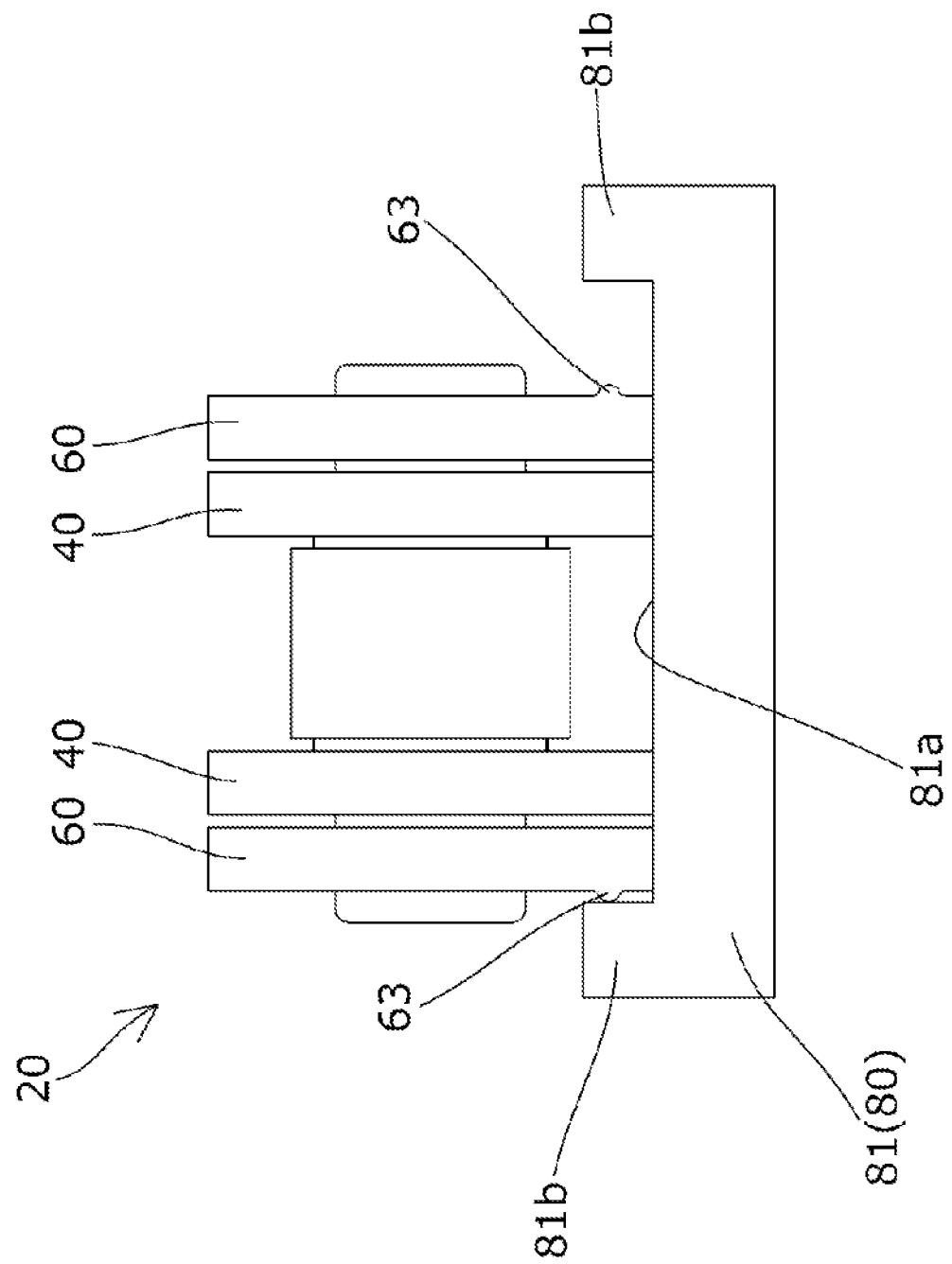

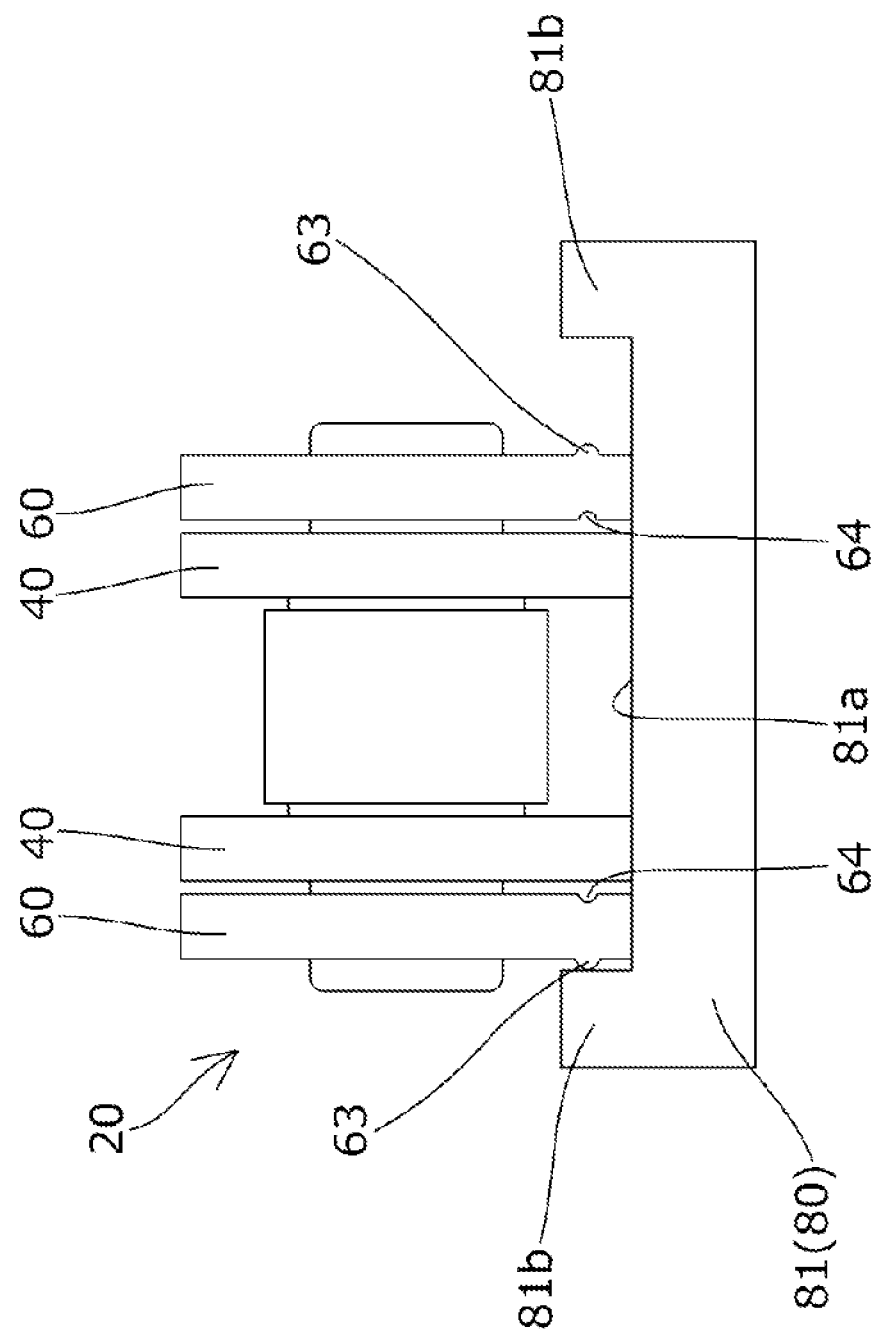

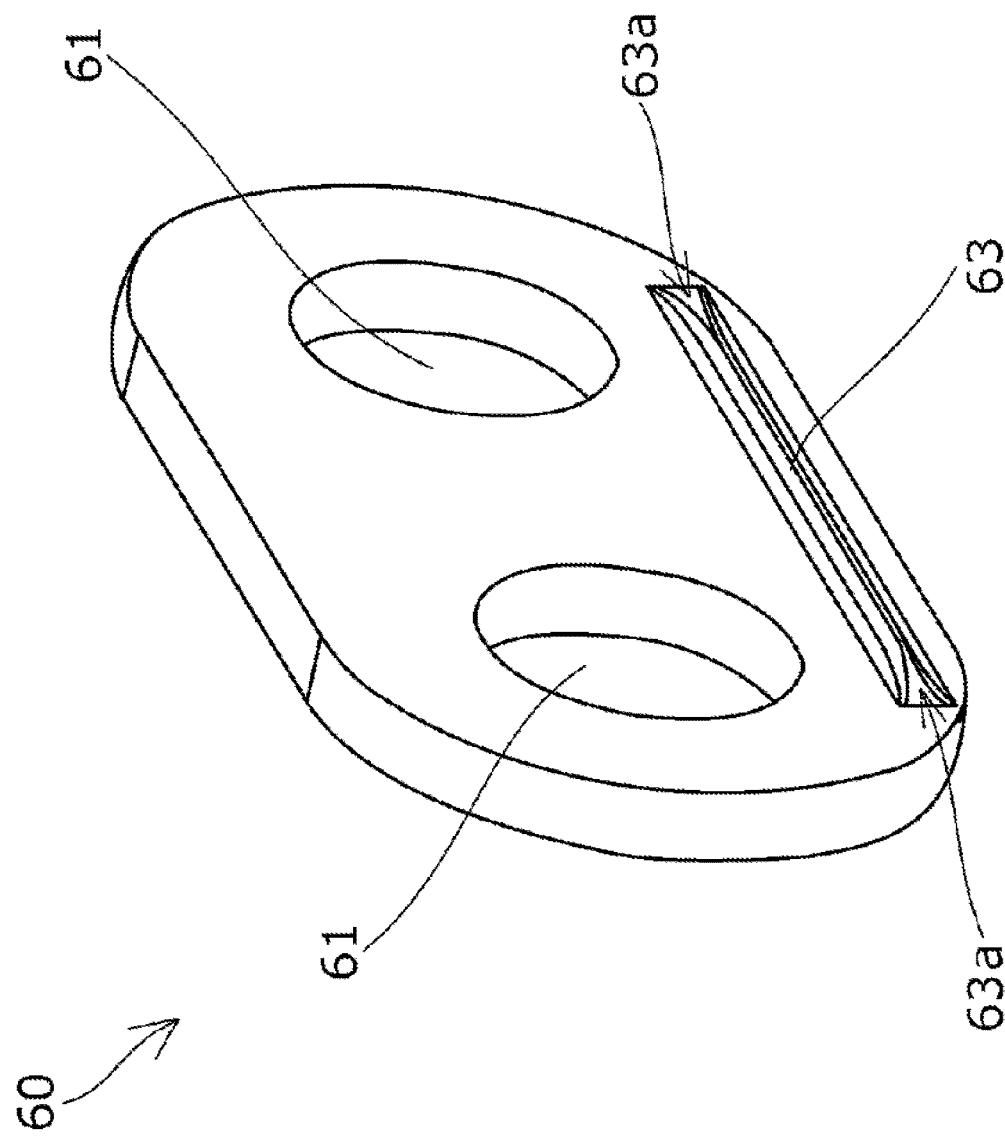

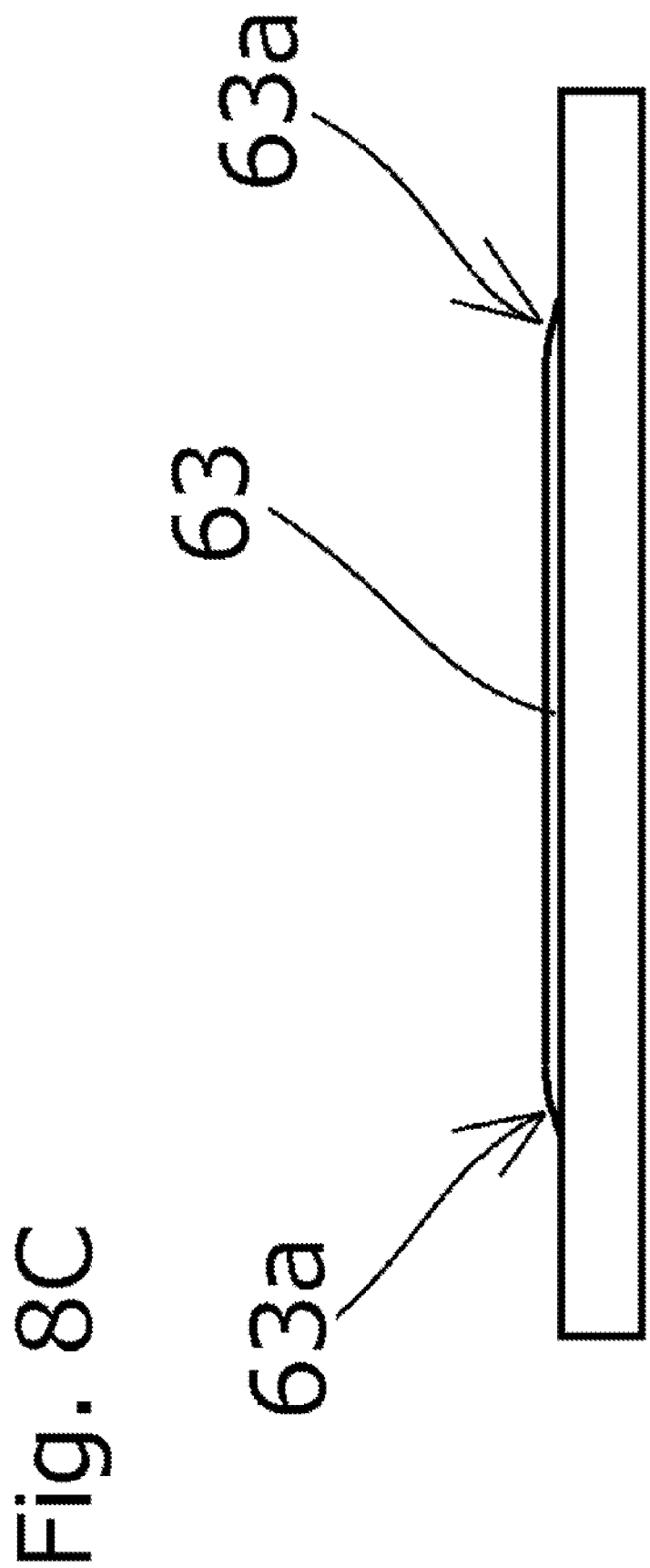

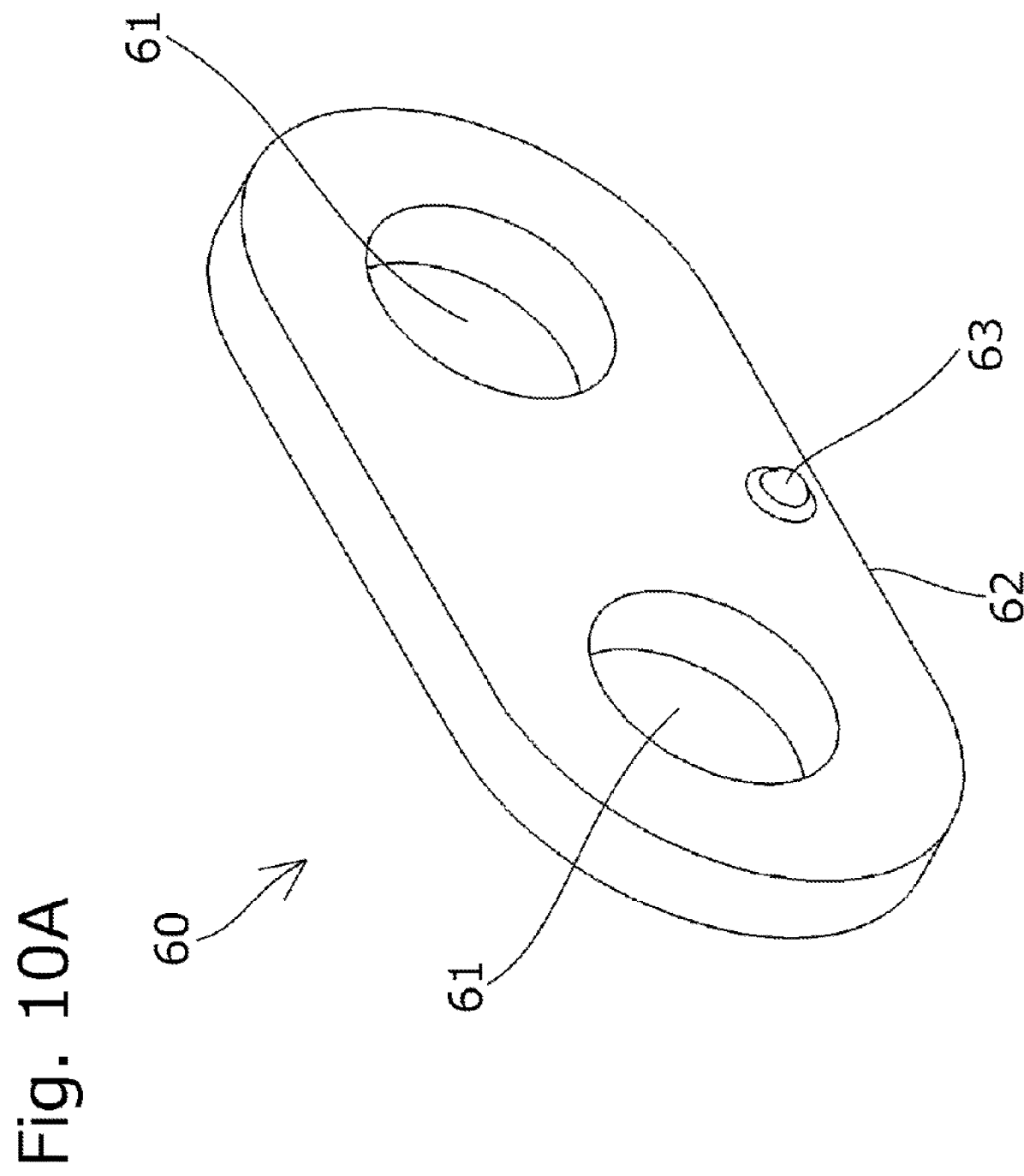

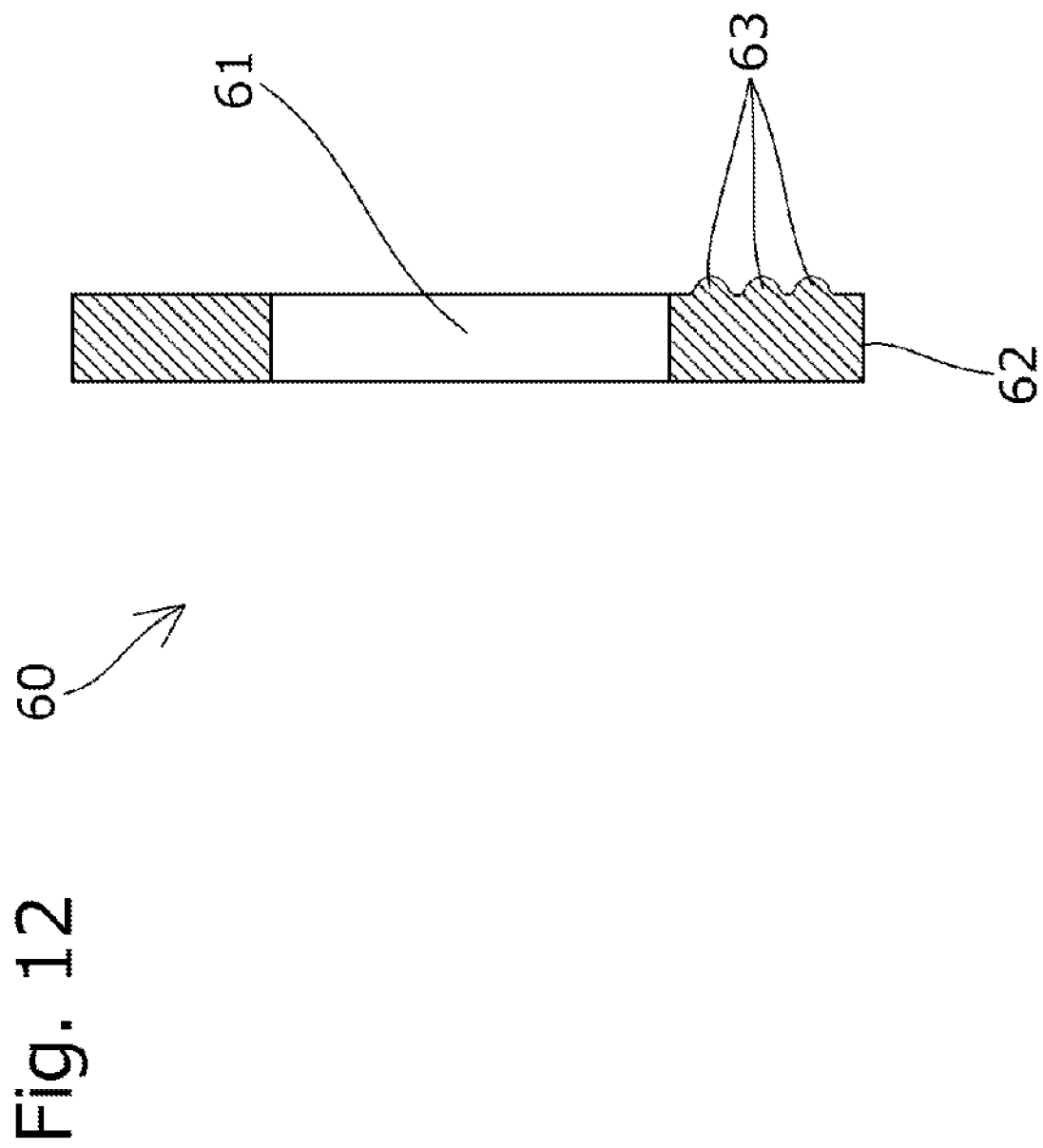

CHAIN AND CHAIN TRANSMISSION DEVICE

BACKGROUND OF THE INVENTION

1. Field of the Invention

The present invention relates to a chain in which a plurality of link plates axe pivotally connected with a connecting pin, and a chain transmission device.

2. Description of the Related Art

Conventionally, there is known a chain transmission device that is incorporated in a timing system or the like in an engine room of an automobile, and includes a chain such as a roller chain that is wound around a plurality of sprockets, and a chain guide that maintains chain tension appropriately (see, for example, Japanese Patent Application Publication No. 2006-242357).

The chain guide is formed with a traveling guide surface that slidably guides a link plate of the chain, and guide lip portions that protrude upward at both ends of the traveling guide surface in a width direction, and the guide lip portions prevent the chain from falling from the chain guide even in the case where the chain is displaced to one side in a chain width direction when the chain travels on the traveling guide surface.

SUMMARY OF THE INVENTION

In the conventional chain transmission device, in the case where the chain is displaced to one side in the chain width direction when the chain travels on the traveling guide surface of the chain guide, an outer surface of an outer plate comes into sliding contact with an inner surface of the guide lip portion in a guide longitudinal direction, and hence the conventional chain transmission device has a problem that the sliding resistance thereof is large and fuel economy performance of an automobile engine deteriorates.

In addition, in the case where the curve of the chain guide along the guide longitudinal direction is large and the radius of curvature of the traveling guide surface is small, pressure from the chain to the inner surface of the guide lip portion increases when the chain is stretched, and hence the above problem becomes worse.

Further, when the chain travels in a state in which the outer surface of the outer plate is in contact with the inner surface of the guide lip portion, there are cases where an oil film between the inner surface of the guide lip portion and the outer surface of the outer plate becomes thin or runs out in the vicinity of the center in the guide longitudinal direction, and hence wear of the inner surface of the guide lip portion progresses and, as a result, it is feared that the smooth traveling of the chain may be hindered, or the guide lip portion may be damaged and the chain may fall off.

The present invention has been made in order to solve these problems, and an object thereof is to provide the chain and the chain transmission device capable of reducing the sliding resistance of the chain to the guide lip portion and stably maintaining the oil film between the guide lip portion and the outer plate.

A chain of the present invent ion is a chain including a plurality of link plates, and connecting pins that pivotally connect the plurality of link plates, wherein the plurality of link plates include outer plates disposed on both outer sides in a chain width direction, each of the outer plates has a pair of front and rear pin holes into which the connecting pins are inserted, a guide-side end surface that faces a traveling guide surface side of a chain guide, and a contact convex portion that protrudes from an outer surface of the outer plate, and the contact convex portion is formed in an area between the pin holes and the guide-side end surface in a plate height direction, whereby the above problems are solved.

A chain transmission device of the present invention is a chain transmission device including the chain, and a chain guide that siidably guides the chain, wherein the chain guide has a traveling guide surface that siidably guides the chain and a guide lip portion that protrudes upward at least at one end of the traveling guide surface in a guide width direction, and the contact convex portion is formed at a height position such that the contact convex portion comes into contact with an inner surface of the guide lip portion when the chain is displaced to one side in the chain width direction, whereby the above problems are solved.

According to one aspect of the present invention, the contact convex portion that protrudes from the outer surface of the crater plate is formed in the area between the pin holes and the guide-side end surface in the plate height direction, whereby, in the case where the chain is displaced to one side in the chain width direction, it is possible to cause the contact convex portion to come into contact with the inner surface of the guide lip portion to avoid contact of the outer surface of the outer plate with the inner surface of the guide lip portion, and hence it is possible to reduce sliding resistance between the guide lip portion and the outer plate.

In addition, the contact convex portion comes into contact with the inner surface of the guide lip portion, whereby a gap is always formed between the inner surface of the guide lip portion and the outer surface of the outer plate, and it is possible to keep an oil film between the inner surface of the guide lip portion and the outer plate from becoming thin or running out, and hence it is possible to prevent the occurrence of wear of or damage to the guide lip portion.

Further, the gap is always formed between the inner surface of the guide lip portion and the outer surface of the outer plate, whereby it is possible to supply oil to space between the guide lip portion and the outer plate from the outside by using the gap, and it is possible to release heat, caused by sliding contact between the guide lip portion and the outer plate to the outside, and hence it is possible to suppress an increase in the temperature of the chain guide. With this, it is possible to suppress the progress of thermal degradation of the chain guide to achieve an increase in the life of the chain guide. In addition, it is possible to maintain the hardness of the chain guide by suppressing the increase in the temperature of the chain guide, and hence it is possible to suppress an increase in sliding resistance.

According to another aspect of the present invention, an apex of the contact convex portion is formed into a carved shape, whereby it is possible to further reduce the sliding resistance of the contact convex portion to the guide lip portion.

According to still another aspect of the present invention, the contact convex portion is formed into a belt-like shape that extends along a chain longitudinal direction, and at least one end of the contact convex portion in the chain longitudinal direction is formed into a curved shape so as to approach the outer surface of the outer plate, toward a tip side of the contact convex portion in the chain longitudinal direction, whereby it is possible to avoid excessive interference of the outer plate with the guide lip portion when the chain enters the chain guide, and gently guide the chain to an inner side in the chain width direction, and hence it is possible to reduce the occurrence of wear or noises resulting from collision of the chain with the chain guide, and suppress an increase in air resistance when the chain is caused to travel at high speed.

According to yet another aspect of the present invention, the contact convex portion is formed as a point-like protrusion, whereby it is possible to cause the outer plate to come into contact with the inner surface of the guide lip portion in a state close to point contact, and hence it is possible to further reduce the sliding resistance between the guide lip portion and the outer plate, and maintain the oil film between the guide lip portion and the outer plate further stably.

According to further another aspect of the present invention, the point-like contact convex portion is formed in plurality so as to be arranged in a chain longitudinal direction, whereby it becomes easier to maintain parallelism of the outer plate with respect to the guide lip portion when the chain comes into contact with the guide lip portion, and hence it is possible to suppress bending of the chain to obtain stable chain traveling.

According to still further another aspect of the present invention, a concave portion is formed in an inner surface of the outer plate at a position corresponding to a position of the contact convex portion in the outer surface of the outer plate, whereby it is possible to form the contact convex portion in the outer plate by press working that presses part of the outer plate from the inner surface side to the outer surface side, and hence it is possible to reduce the load of manufacturing the chain. In addition, it is possible to remove a residual stress of a plate surface by the press working to which the outer plate is subjected, and hence it is possible to improve the strength of the outer plate. Further, it is possible to cause the concave portion formed in the inner surface of the outer plate to function as an oil storage portion, and hence it is possible to reduce the sliding resistance between the outer plate and an inner plate.

According to yet further another aspect of the present invention, the contact convex portion is formed in plurality so as to be arranged in the plate height direction, whereby it is possible to stabilize the contact state of the outer plate with the inner surface of the guide lip portion to realize stable chain traveling. In addition, it is possible to supply the oil to the space between the guide lip portion and the outer plate from the outside by using a gap between the contact convex portions, and hence the function of forming the oil film is not spoiled.

BRIEF DESCRIPTION OF THE DRAWINGS

FIG. 5 is an explanatory view showing a chain traveling state on a chain guide in Embodiment 1;

FIG. 7 is an explanatory view showing the chain traveling state on the chain guide in Embodiment 2;

FIG. 8A is an explanatory view showing the outer plate, according to Embodiment 3;

FIG. 8C is an explanatory view showing the outer plate according to Embodiment 3;

FIG. 10A is an explanatory view showing the outer plate according to Embodiment 4;

FIG. 12 is an explanatory view showing a modification of the outer plate.

DESCRIPTION OF THE PREFERRED EMBODIMENTS

Hereinbelow, a chain transmission device 10 according to Embodiment 1 of the present invention will be described based on the drawings.

Figure 1:
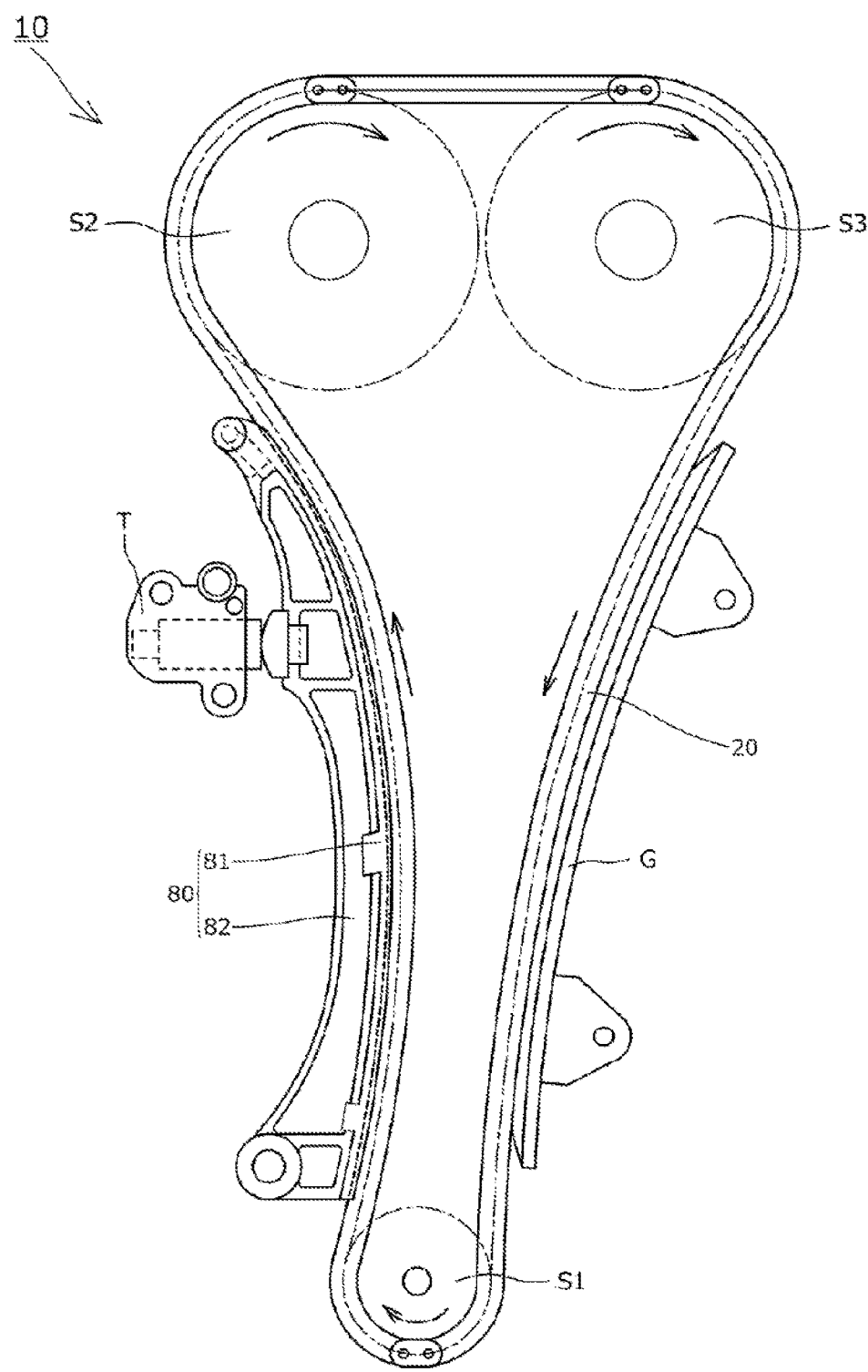
FIG. 1 is an explanatory view showing a used state of a chain transmission device according to Embodiment 1 of the present invention.

As shown in FIG. 1, the chain transmission device 10 is incorporated in a timing system for an automobile engine, and includes sprockets S1 to S3 that are provided in a crankshaft and a camshaft in an engine room, a chain 20 that is wound around the sprockets S1 to S3, a chain guide 80 serving as a movable guide that is installed on a slack side of the chain 20, a fixed guide G that is installed on a tense side of the chain 20, and a tensioner T that presses the chain guide 80 toward the chain 20.

The chain guide 80 is swingably mounted to an engine block (not shown) and slidably guides the chain 20 and, as shown in FIG. 1, the chain guide 80 includes a guide shoe 81 that slidably guides the traveling chain 20, and a base member 82 that supports the guide shoe 81 along a guide longitudinal direction (chain longitudinal direction). Each of the guide shoe 81 and the base member 82 is formed of a synthetic resin material or the like.

Figure 2:
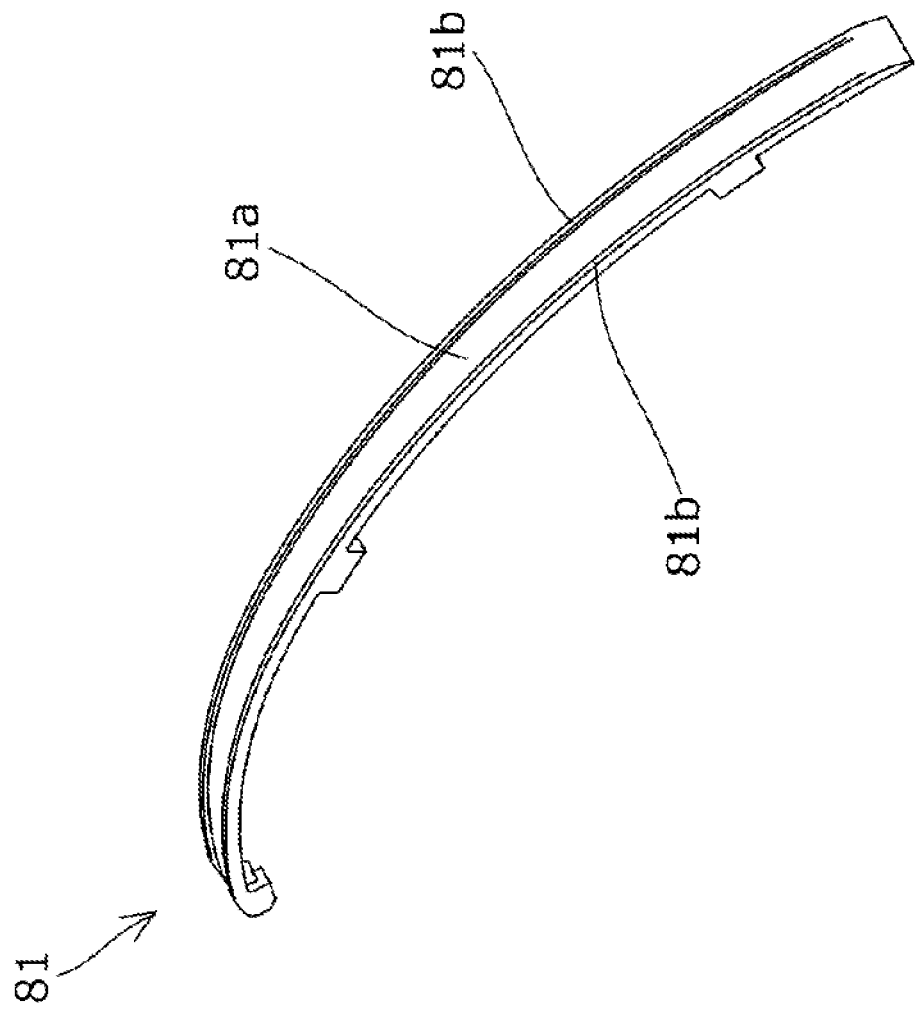
FIG. 2 is a perspective view showing a guide shoe of a chain guide.

As shown in FIG. 2, the guide shoe 81 has a traveling guide surface 81*a* that extends in the chain longitudinal direction and slidably guides the chain 20, and guide lip portions 81*b* that protrude upward at both ends of the traveling guide surface 81*a* in a guide width direction.

An inner surface slope that is inclined toward an inner-side in a width direction as it approaches a far side in a chain traveling direction is provided at the end portion of each guide lip portion 81*b* on a near side in the chain traveling direction. Each inner surface slope is formed into a curved shape (so-called R-shape) that is convex toward the inner side in the width direction.

Figure 3:
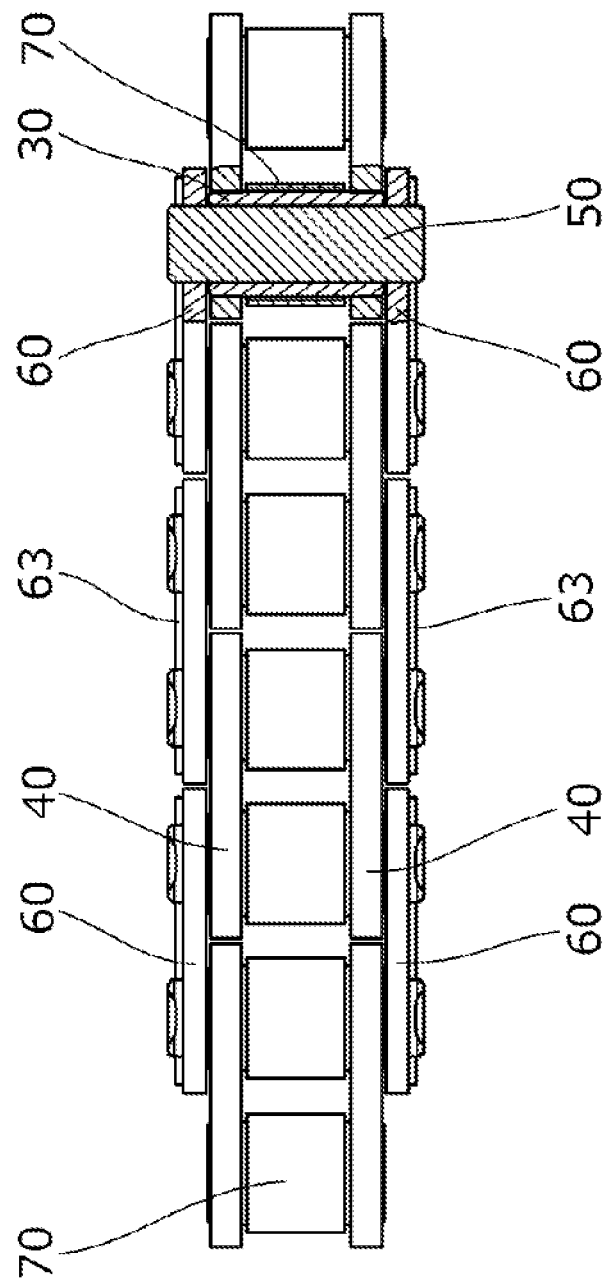
FIG. 3 is an explanatory view showing part of a chain in a cross-sectional view.

The chain 20 is configured as a so-called roller chain and, as shown in FIG. 3, the chain 20 includes a plurality of inner links each obtained by fixing bath ends of a pair of front and rear bushings 30 to bushing holes of a pair of left and right inner plates (link plates) 40, a plurality of outer links each obtained by fixing both ends of a pair of front and rear connecting pins 50 to pin holes 61 of a pair of left and right outer plates (link plates) 68, and rollers 70 that are fitted on the bushings 30. The inner links and the outer links are alternately connected in the chain longitudinal direction by inserting the connecting pins 50 into the bushings 30. Both ends of the connecting pin 50 protrude from outer surfaces of the outer plates 60.

Figure 4A:
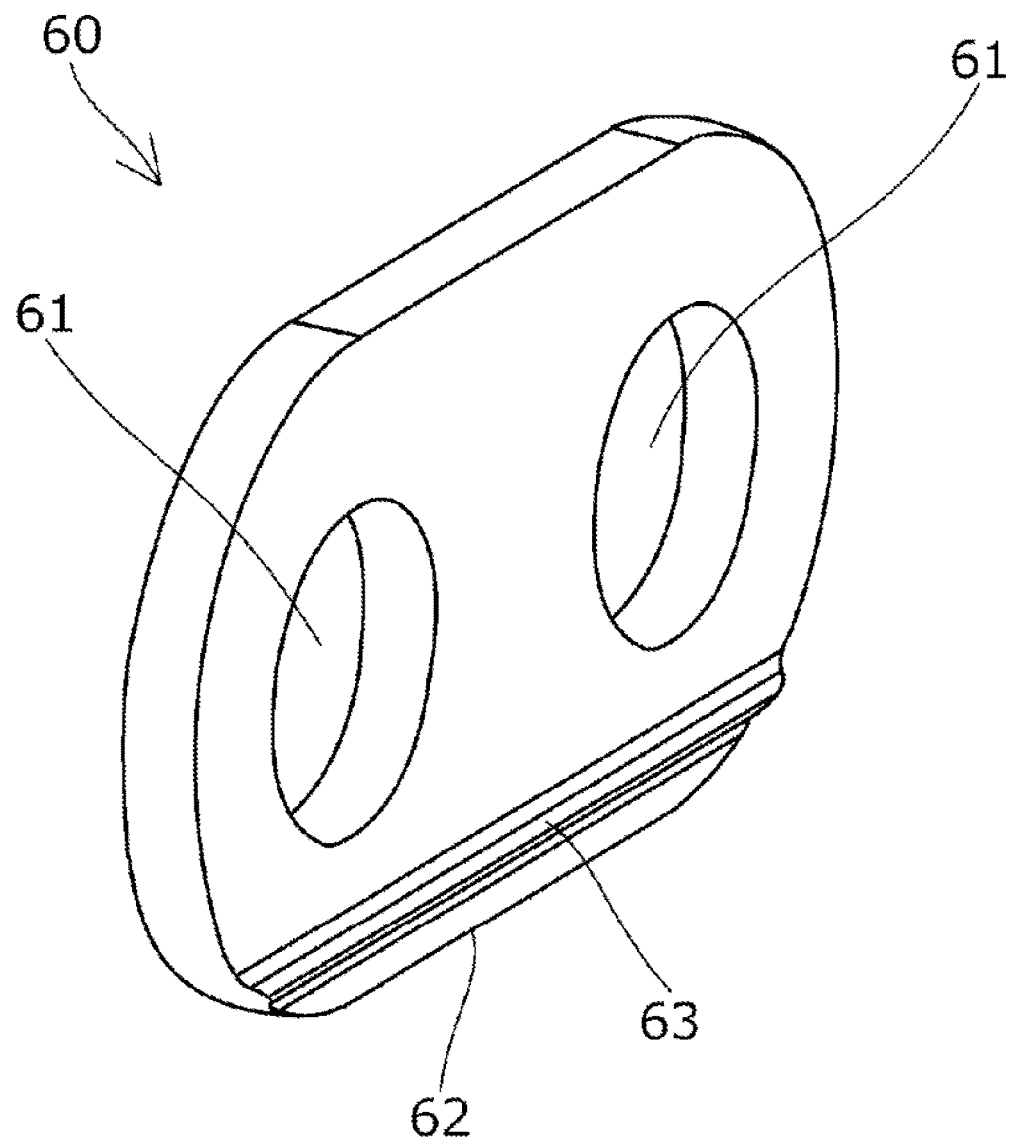
FIG. 4A is an explanatory view showing an outer plate according to Embodiment 1.
Figure 4B:
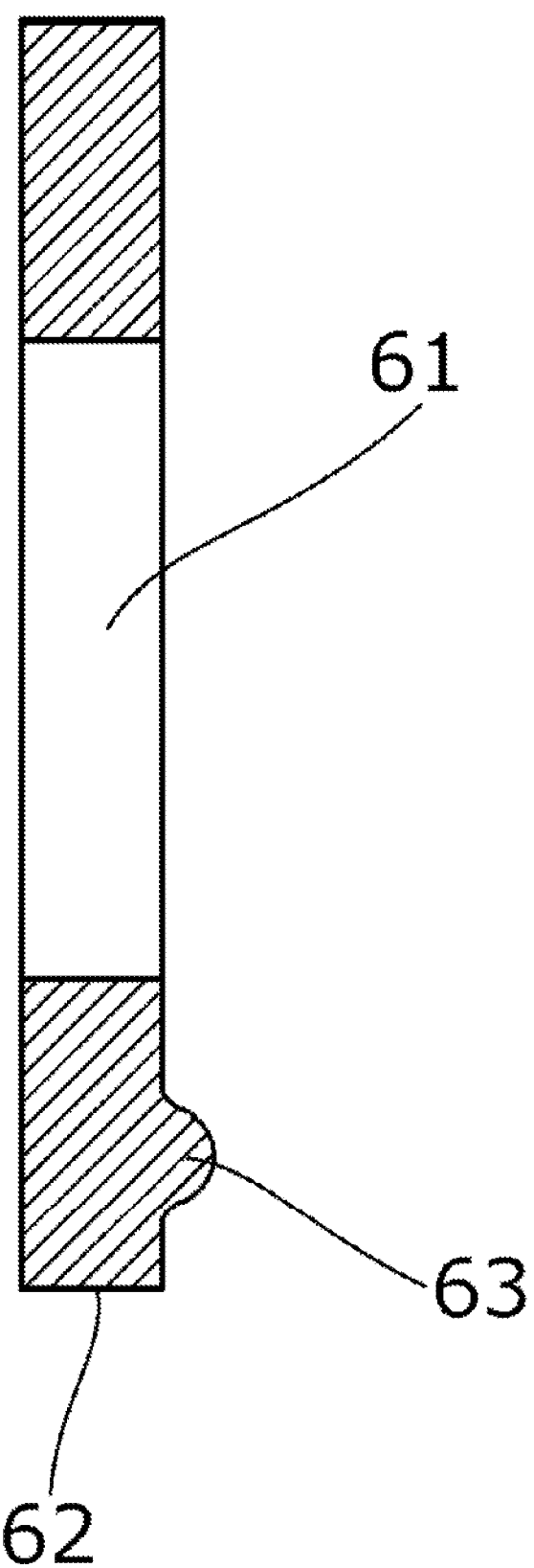
FIG. 4B is an explanatory view showing the outer plate according to Embodiment 1.

As shown in FIGS. 4A and 4B, the outer plate 60 has a pair of front and rear pin holes 61 into which the connecting pins 50 are inserted, a guide-side end surface (lower end surface) 62 that faces the traveling guide surface 81a side of the chain guide 80, and a contact convex portion 63 that protrudes from the outer surface of the outer plate 60.

As shown in FIGS. 4A and 4B, the contact convex portion 63 is formed in an area between the pin hole 61 (the outer edge thereof) and the guide-side end surface 62 in a plate height direction. More specifically, as shown in FIG. 5, the contact convex portion 63 is formed at a height position such that the contact, convex portion 63 comes into contact with an inner surface of the guide lip portion 81b in the case where the chain 20 is displaced to one side in a chain width direction.

As shown in FIGS. 4A and 4B, the contact convex portion 63 is formed into a belt-like shape that extends along the chain longitudinal direction from one end edge of the outer plate 60 to the other end edge thereof in the chain longitudinal direction. In addition, the cross-sectional shape (the cross-sectional shape in the case where the contact convex portion 63 is viewed cross-sectionally in a virtual plane orthogonal to the chain longitudinal direction) of the contact convex portion 63 is formed into a semicircular or substantially semicircular shape, and the apex of the contact convex portion 63 is formed into a curved shape.

Next, the chain transmission device 10 according to Embodiment 2 of the present invention will be described based on FIGS. 6A and 6B and FIG. 7. Herein, Embodiment 2 is exactly the same as Embodiment 1 described above except part of the configuration of the outer plate 60, and hence the description of the configuration other than the difference will be omitted.

Figure 6A:
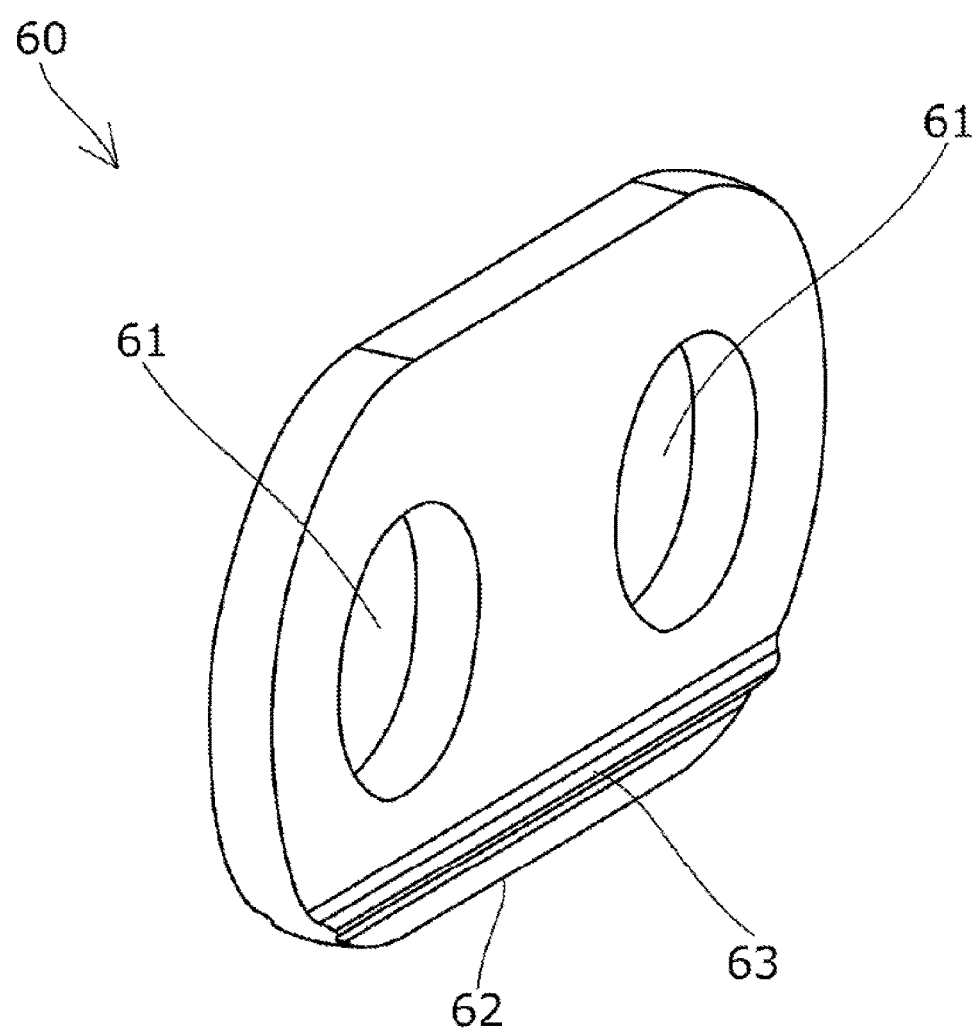
FIG. 6A is an explanatory view showing the outer plate according to Embodiment 2.
Figure 6B:
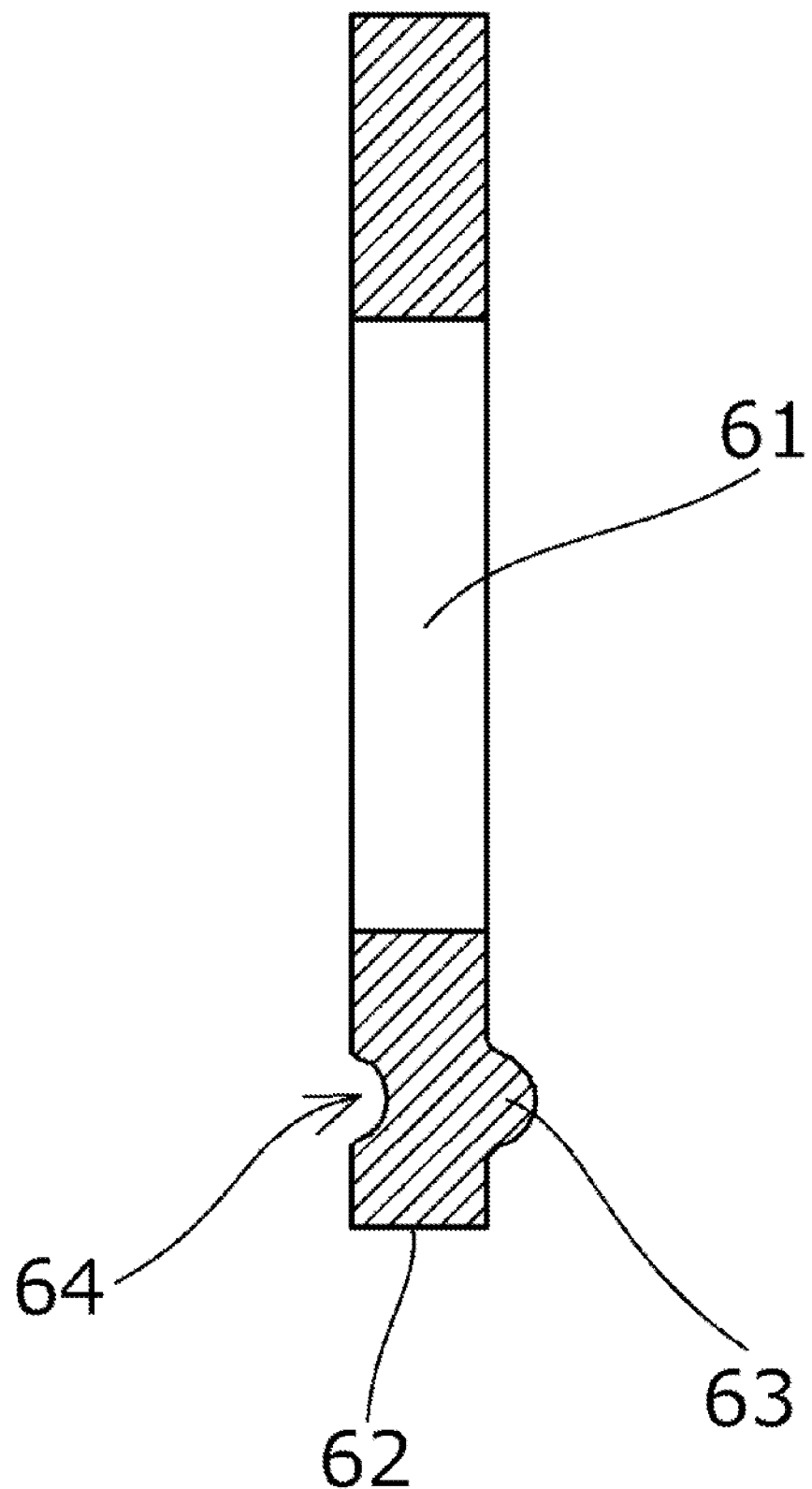
FIG. 6B is an explanatory view showing the outer plate according to Embodiment 2.

In Embodiment 2, as shown in FIGS. 6A and 6B, a concave portion 64 is formed in an inner surface of the outer plate 60 at a position corresponding to the position of the contact convex portion 63 in the outer surface of the outer plate 60.

The concave portion 64 is formed together with the contact convex portion 63 by press working that presses part of the outer plate 60 from the inner surface side to the outer surface side. Note that the contact convex portion 63 and the concave portion 64 may also be formed by other methods such as machining.

In Embodiment 2 obtained in this manner, as shown in FIG. 7, it is possible to cause the concave portion 64 formed in the inner surface of the outer plate 60 to function as an oil storage portion, and hence it is possible to reduce sliding resistance between the outer plate 60 and the inner plate 40.

Next, the chain transmission device 10 according to Embodiment 3 of the present invention will be described based on FIGS. 8A to 8C and FIG. 9. Herein, Embodiment 3 is exactly the same as Embodiment 1 described above except part of the configuration of the outer plate 60, and hence the description of the configuration other than the difference will be omitted.

Figure 8B:
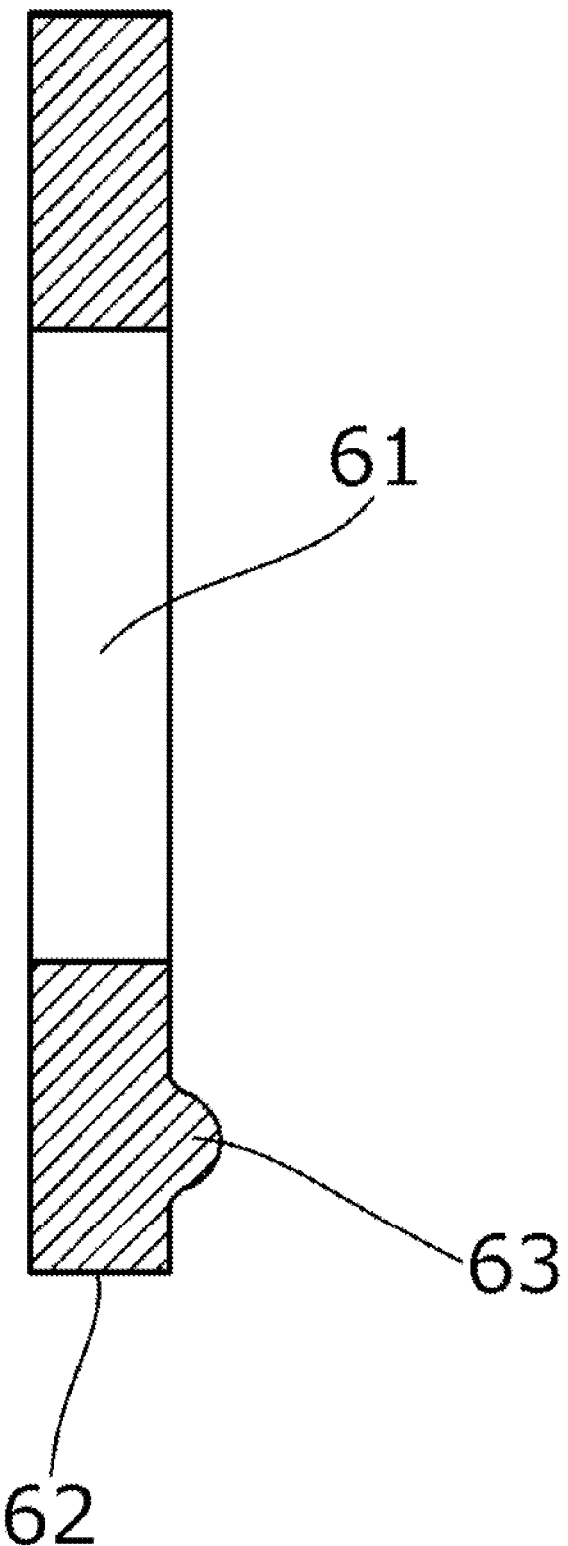
FIG. 8B is an explanatory view showing the outer plate according to Embodiment 3.

In Embodiment 3, as shown in FIGS. 8A to 8C, each of end portions 63a of the belt-like contact convex portion 63 in the chain longitudinal direction is formed into a curved shape so as to approach the outer surface of the outer plate 60, toward a tip side (outer side) of the contact convex portion 63 in the chain longitudinal direction.

In addition, in Embodiment 3, as shown in FIGS. 8A to 8C, the contact convex portion 63 does not reach one end edge and the other end edge of the outer plate 60 in the chain longitudinal direction.

More specifically, in Embodiment 3, as shown in FIGS. 8A to 8C, the contact convex portion 63 is formed such that both ends of the contact convex portion 63 are positioned outwardly, in the chain longitudinal direction, of a line that passes though the center of the pin hole 61 and extends in a direction orthogonal to the chain longitudinal direction.

Figure 9:
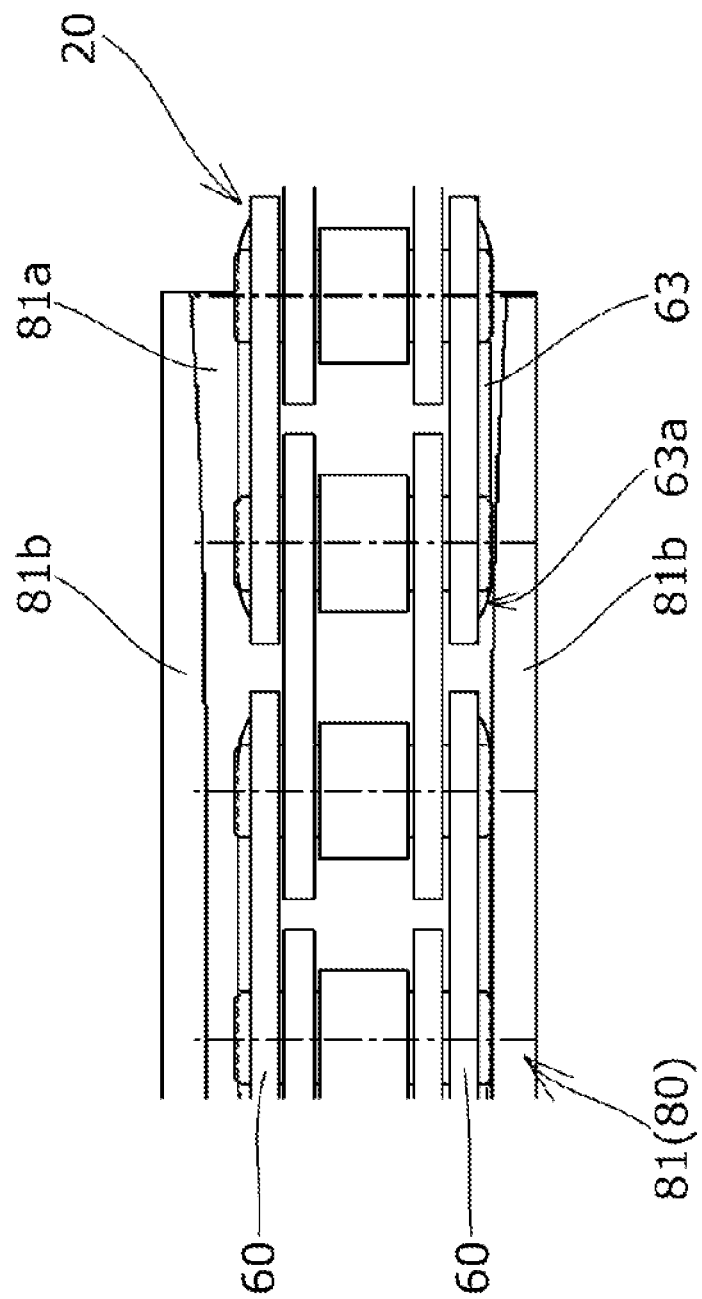
FIG. 9 is an explanatory view showing the chain traveling state on the chain guide in Embodiment 3.

In Embodiment 3 obtained in this manner, by forming the end portion 63a of the contact convex portion 63 into the curved shape, it is possible to avoid excessive interference of the contact convex portion. 63 with the guide lip portion 81b when the chain 20 enters the chain guide 80, and gently guide the chain 20 to an inner side in the chain width direction, as shown in FIG. 9.

Note that, in Embodiment 3, both ends of the contact convex portion 63 in the chain longitudinal direction are formed into the curved shapes, but only one of the ends of the contact convex portion 63 in the chain longitudinal direction may be formed into the curved shape. In the case where only one of the ends of the contact convex portion 63 is formed into the curved shape, it is preferable to cause the end of the contact convex portion 63 formed into the curved shape to be oriented toward the front side in the chain traveling direction.

Next, the chain transmission device 10 according to Embodiment 4 of the present, invention will be described based on FIGS. 10A and 10B. Herein, Embodiment 4 is exactly the same as Embodiment 1 described above except part of the configuration of the outer plate 60, and hence the description of the configuration other than the difference will be omitted.

Figure 10B:
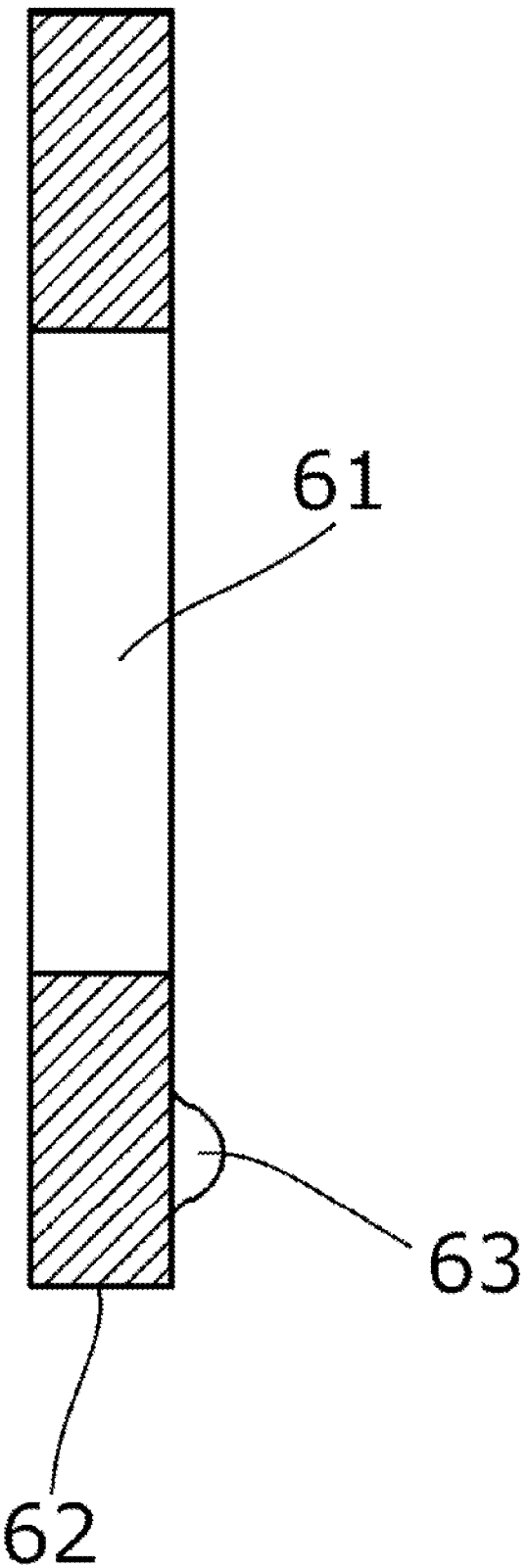
FIG. 10B is an explanatory view showing the outer plate according to Embodiment 4.

In Embodiment 4, as shown in FIGS. 10A and 10B, the contact convex portion 63 is formed as a point-like protrusion at the center position of the outer plate 60 in the chain longitudinal direction.

Note that, as shown in FIGS. 10A and 10B, with regard to the specific shape of the contact, convex portion 63, the contact, convex portion 63 is preferably formed into a semicircular or substantially semicircular shape, but the specific shape of the contact convex portion 63 may be any shape. In addition, from the viewpoint of reducing the sliding resistance of the contact convex portion 63 to the guide lip portion 81b, at least the tip side of the contact convex portion 63 is preferably formed into a spherical or substantially spherical shape.

Figure 11:
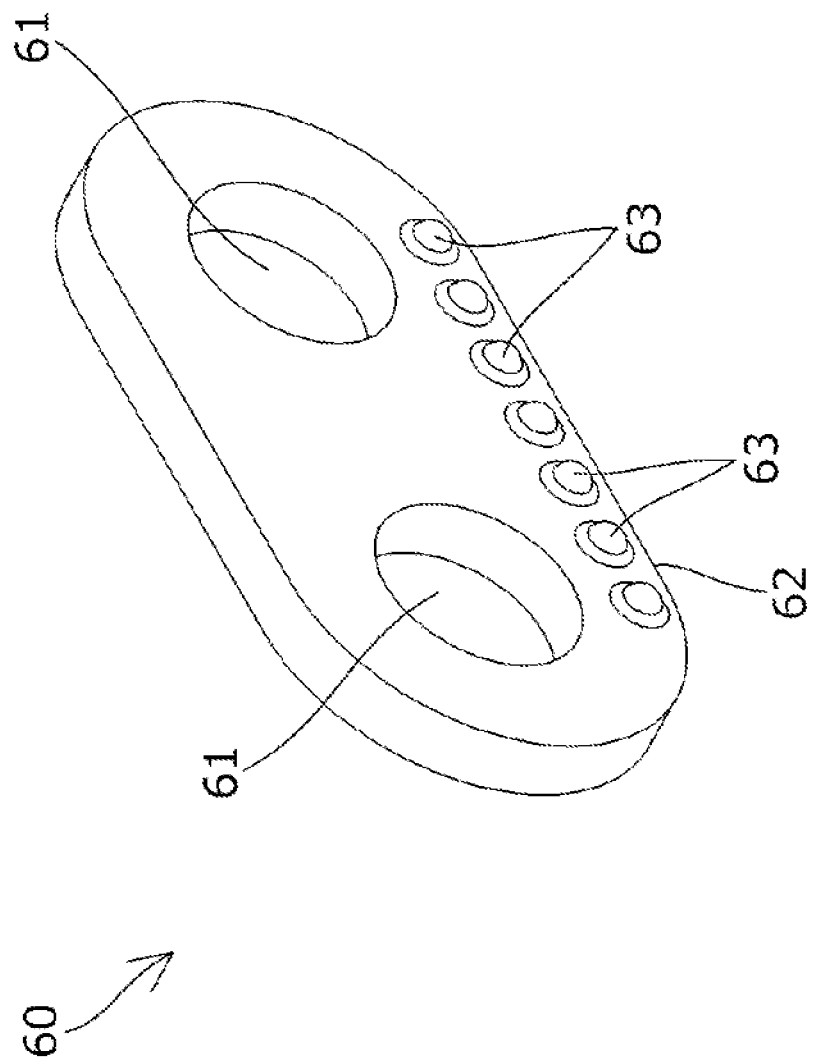
FIG. 11 is a perspective view showing a modification of the outer plate according to Embodiment 4.

In addition, as a modification of Embodiment 4, as shown in FIG. 11, the contact convex portion 63 may be formed in plurality so as to be arranged in the chain longitudinal direction.

Note that the belt-like contact convex portion 63 in each of Embodiments 1 to 3 described above may be divided into plurality, and the plurality of contact convex portions 63 may also be formed so as to be arranged in the chain longitudinal direction.

Further, as a modification common to Embodiments 1 to 4, as shown in FIG. 12, the contact convex portion 63 may be formed in plurality so as to be arranged in the plate height direction.

Thus, the embodiments of the present invention have been described in detail, but the present invention is not limited to the above embodiments, and various design changes can be made without departing from the present invention described in the scope of claims.

For example, the chain transmission device may be constituted by arbitrarily combining the configurations of the plurality of embodiments described above and, for example, the concave portion formed in the inner surface of the outer plate in Embodiment 2 may also be applied to the outer plates in the other embodiments.

In addition, in each of the embodiments described above, the description has been made on the assumption that the chain is the so-called roller chain, but the specific configuration of the chain may be any configuration as long as the plurality of link plates are pivotally connected with the connecting pin in the configuration, and the chain may also be, for example, a bushing chain or a silent chain.

Further, in each of the embodiments described above, the description has been made on the assumption that the chain is a timing chain for the automobile engine, but the specific use of the chain may be any use.

In addition, in each of the embodiments described above, the description has been made on the assumption that the chain travels in the state in which the guide-side end surfaces (lower end surfaces) of the outer plate and the inner plate are caused to slide on the traveling guide surface of the chain guide, but the specific configuration of the chain is not limited to the above configuration. For example, only the guide-side end surface of the outer plate may be caused to come into contact with the traveling guide surface during the traveling of the chain, and only the guide-side end surface of the inner plate may also be caused to come into contact with the traveling guide surface during the traveling of the chain.

Further, in each of the embodiments described above, the chain guide is configured as a swinging guide that is swingably mounted to the engine block (mounting target), but the chain guide may also be configured as a fixed guide that is fixed to the engine block.

In addition, in each of the embodiments described above, the description has been made on the assumption that the contact convex portion is formed integrally with the outer plate, but the specific configuration of the contact convex portion is not limited to the above configuration. The contact convex portion may be formed separately from the outer plate, and the contact convex portion may be fixed to the outer surface of the outer plate by means such as bonding. Further, the specific shape of the contact convex portion may be any shape, but the apex of the contact convex portion is preferably formed into the curved shape in view of reduction of the sliding resistance to the guide lip portion.

In addition, in each of the embodiments described above, the description has been made on the assumption that the chain guide is constituted by the guide shoe and the base member, and both of the traveling guide surface and the guide lip portion are formed in the guide shoe, but the specific configuration of the chain guide is not limited thereto. For example, the entire chain guide may be formed integrally, or the guide lip portion may be formed in the base member.

Further, in each of the embodiments described above, the description has been made on the assumption that the guide lip portions are formed at the both ends of the traveling guide surface in the guide width direction, but it is only necessary to form the guide lip portion at least at one end of the traveling guide surface in the guide width direction.

What is claimed is:

1. A chain comprising:
a plurality of link plates; and
connecting pins that pivotally connect the plurality of link plates,
wherein the plurality of link plates include outer plates disposed on both outer sides in a chain width direction,
wherein each of the outer plates has a pair of front and rear pin holes into which the connecting pins are inserted, a guide-side end surface that faces a traveling guide surface side of a chain guide, and a contact convex portion that protrudes from an outer surface of the outer plate,
wherein the contact convex portion is formed in an area between the pin holes and the guide-side end surface in a plate height direction, and
wherein the contact convex portion is formed into a belt-like shape that extends along a chain longitudinal direction of the chain.

2. The chain according to claim 1, wherein an apex of the contact convex portion is formed into a curved shape.

3. The chain according to claim 1,
wherein at least one end of the contact convex portion in the chain longitudinal direction is formed into a curved shape so as to approach the outer surface of the outer plate, toward a tip side of the contact convex portion in the chain longitudinal direction.

4. The chain according to claim 1, wherein a concave portion is formed in an inner surface of the outer plate at a position corresponding to a position of the contact convex portion in the outer surface of the outer plate.

5. The chain according to claim 1, wherein the contact convex portion is formed so as to be arranged in the plate height direction.

6. A chain transmission device comprising:
the chain according to claim 1; and
a chain guide that slidably guides the chain, wherein
the chain guide has a traveling guide surface that slidably guides the chain and a guide lip portion that protrudes upward at least at one end of the traveling guide surface in a guide width direction, and
the contact convex portion is formed at a height position such that the contact convex portion comes into contact with an inner surface of the guide lip portion when the chain is displaced to one side in the chain width direction.

* * * * *